July 22, 1969  MASAO WAKATSUKI ET AL  3,457,043
METHOD OF CONVERTING CARBONACEOUS MATERIAL TO DIAMOND
Filed Jan. 17, 1967
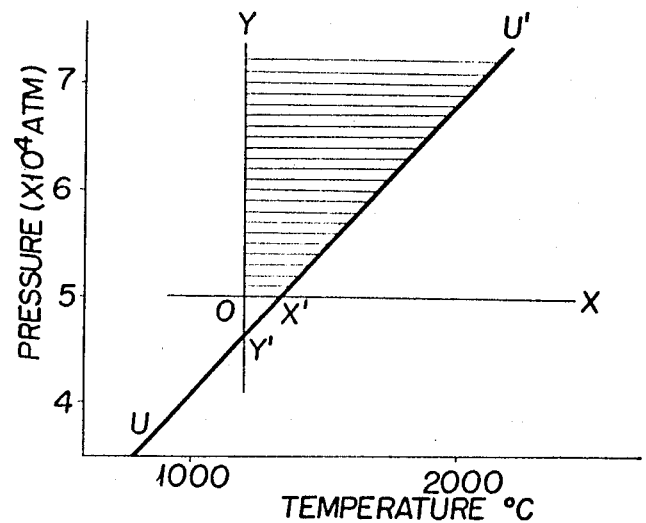
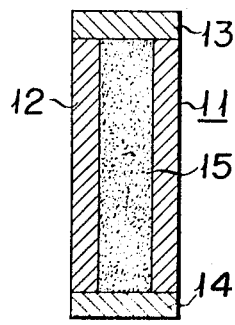
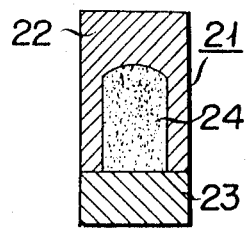

3,457,043
METHOD OF CONVERTING CARBONACEOUS MATERIAL TO DIAMOND

Masao Wakatsuki and Toshio Aoki, Yokohama-shi, and Nobuyuki Wakamatsu, Tokyo, Japan, assignors to Tokyo Shibaura Electric Co., Ltd., Kawasaki-shi, Japan, a corporation of Japan
Filed Jan. 17, 1967, Ser. No. 609,826
Claims priority, application Japan, Feb. 4, 1966, 41/6,100
Int. Cl. C01b 31/06
U.S. Cl. 23—209.1
3 Claims

ABSTRACT OF THE DISCLOSURE

A process for manufacturing synthetic diamond from various kinds of carbonaceous material which comprises subjecting a carbonaceous material by the conventional means to an elevated pressure of at least 50,000 atmospheres and an elevated temperature of at least 1200° C. for a period of preferably 5 to 20 minutes in the presence of a novel catalyst, said novel catalyst being niobium carbide combined with at least one metal selected from copper, silver and gold.

---

This invention relates to a method of converting carbonaceous material to diamond and more particularly to the synthesis of diamond employing a novel catalyst in the conventional production method of synthesized diamond.

Diamond, whose utilities extend over a great variety of fields of applications both for ornamental and industrial purposes, is so limited in the amount of natural yields owing to the few known sources of diamond that it can scarcely meet the increasing demands at present. Moreover, high quality diamond crystals suitable for these applications amount to a very limited proportion of the total supply of natural diamonds. Many attempts have been made to artificially convert carbonaceous materials to diamond. Studies on thermodynamics have made it evident that graphite can be converted into diamond crystals with a very high pressure and very high temperatures. In order to convert graphite directly into diamond, however, at least pressure of 130,000 atmospheres and a temperature of 4000° C. are required. A number of problems accordingly reside in the technique of designing and operating the converting device which is bearable to such a high pressure and high temperature, and these factors cause the diamond synthesizing process mentioned above to be impractical. The pressure and temperature practically available are lower than 100,000 atmospheres and 2000° C., respectively. To meet these requirements catalysts which are useful for the formation of diamond crystals in a relativley low pressure and tempearture have heretofore been proposed. For example, U.S. Patents Nos. 2,947,610 and 2,947,611 disclose, as preferred catalysts, twelve elements, i.e. iron, nickel, cobalt, platinum, palladium, ruthenium, osmium, iridium, rhodium, chromium, manganese and tantalum. Synthesized diamond crystals may be obtained for example by maintaining graphite in contact with nickel under a pressure of 70,000 atmospheres at a temperature of from 1600° to 1800° C. for about one minute. The crystals thus obtained by employing nickel, however, are always colored yellowish green and it is extremely difficult to grow colorless, transparent crystals of large grain and of the natural crystal habit. Furthermore, when the conversion temperature is elevated beyond a certain point, feather-like or dendritic crystals tend to develop. A drop of the temperature below that certain point will result in the formation of only hexahedral crystals of poor transparency, with the result that a very precise temperature control is required to maintain the optimum temperature under a given pressure and the operations involved in such temperature control prove to be very difficult and troublesome under the conditions of elevated temperatures and elevated pressures. Even if the difficulty in the temperature control could be overcome, the diameters of diamond crystals obtainable will usually extend over a wide range of from ten-odd microns to 0.3 mm., and it would practically be impossible to constantly obtain diamond crystals of substantially a uniform grain size. These tendencies become more conspicuous when iron, cobalt and the other known catalysts are used in place of nickel.

In our copending application Ser. No. 567,743 filed July 25, 1966, there is described a method of making diamond crystals which comprises subjecting a carbonaceous material to a pressure of at least 50,000 atmospheres and a temperature of over 1200° C. in the presence of niobium metal solely or coexisted with other metals such as copper family elements and so on. Although the method of this aforementioned copending application is satisfactory for converting carbonaceous materials, such as graphite, to diamond, the process of this application is somewhat deficient in that the yield of diamond is rather poor depending on the reaction conditions to be employed such as the pressure, temperature, reaction time and carbonaceous material.

An object of this invention is to provide a method whereby carbonaceous materials can be converted in the presence of new catalysts to diamonds of pure or substantially colorless and transparent crystals.

Another object of this invention is to provide a method whereby carbonaceous materials can be converted in the presence of new catalysts to diamonds which are excellent in crystals structure, right in the natural crystal habit, and uniform and relatively large in grain size.

A further object of this invention is to provide a method whereby carbonaceous materials can be effectively converted in the presence of new catalysts to diamonds at a relatively low pressure and low temperature.

These and other objects of this invention are accomplished by subjecting a carbonaceous material to an elevated pressure and an elevated temperature in the presence of, as a novel catalyst, niobium carbide combined with at least one element selected from the copper family elements viz. copper, silver, gold.

The features of the invention which are believed to be novel are set forth with particularity in the appended claims. The inventon itself, however, as to its organization together with further objects and advantages thereof, may best be understood by reference to the following description taken in connection with the accompanying drawing, in which:

FIG. 1 is a diagram of a diamond-graphite equilibrium line calculated from a theory;

FIG. 2 is an enlarged sectional vertical view of a reaction vessel used in this invention;

FIG. 3 is an enlarged sectional vertical view of a modified reaction vessel used in this invention.

According to the method of this invention, the preferred alloys or mixtures to be used as a catalyst in the present invention may contain elements other than niobium carbide, copper, silver and gold. For example pure niobium may be contained in the catalyst to be used in this invention method. Furthermore, the catalyst may contain other various metals as long as they do not give bad effect on the quality of diamond crystals to be obtained. For example, such compositions as niobium-copper-niobium carbide-aluminum, or niobium carbide-tin-copper can serve as a catalyst. The component elements forming the catalysts may either be alloyed or mixed together by any suitable manner. What is essential to the catalyst to be used in this invention is presence of niobium carbide combined with at least one metal selected from copper, silver and gold. It should be noted that the following twelve elements, viz iron, nickel, cobalt, platinum, palladium, ruthenium, osmium, iridium, rhodium, chromium, manganese and tantalum are not appropriate to be included as a component of the catalyst, since these metals have catalytic actions per se in diamond synthesis and tend to produce poor quality diamond crystals as described above.

As for copper, silver and gold to be used in this invention they may be either in the pure or elemental state, or in the form of compounds. For example, copper suboxide, silver oxide, or sulfides of these elements may be used in substitution of pure copper, silver or gold as effectively as the pure ones. It is believed that these compounds are in the molten phase under high pressures and at high temperatures to be used in the present invention and decompose themselves liberating free pure elements from the compounds thereof.

As for carbonaceous materials to be transformed to diamond, almost all the substances containing carbon in various forms may be used. Graphite is the simplest form of carbon and is the most suitable starting material for diamond synthesis. However, it is also possible to use, as raw materials for diamond formation, amorphous carbon, coal, coke, charcoal, or sugar charcoal containing carbon as its major component, or organic substances containing a number of carbon atoms, such as coal tar, pitch, wood, paper, naphthalene, wax or paraffin. Under the conditions of high reaction temperatures and pressures these organic substances liberate free carbon which is believed to be converted to diamond. In addition to these materials, waste fine diamond power selected from synthesized diamond can of course be re-used as the raw materials independently or in the form of a mixture with other materials convertible to diamond so as to grow into a crystal of a larger size.

There is practically no limit to the mixing ratio between the carbonaceous material and the catalyst, and to the physical form thereof. Regardless of the mixing ratio and the physical form the formation and growth of diamond crystals occur surely at the interfaces between the carbonaceous material and the catalyst.

The reaction time of as short as 2 minutes may be satisfactory to cause the conversion of the carbonaceous material to diamond crystals. In general, however, it is preferred to leave the carbonaceous material and the catalyst at the reaction pressure and temperature for about 5 to 20 minutes. No disadvantage has been observed in exposing the reactants to the high pressure and high temperature for extended periods of time.

The straight line UU' in FIG. 1 indicates a well known diamond-graphite equilibrium line calculated from the theory given by R. Berman and Sir Francis Simon (Zeitschrift für Elektrochemie 59, 333 (1955). The region defined by three crossing straight lines OX, YO and UU', that is U'X'OY, represents the conditions whereby diamond crystals may be obtained in accordance with the method of this invention. The line OX indicates a pressure level of 50,000 atmospheres and the line YO indicates a temperature level of 1200° C. The thermodynamic conditions represented by line UU' are independent of the type and physical form of the catalyst to be employed as well as means of applying pressure and heat.

It has been discovered that niobium in the form of carbide partly or wholly and coexisted with at least one element selected from the copper family elements, viz copper, silver and gold, is more superior as a catalyst for the formation of diamond crystal than pure niobium or pure niobium coexisted with at least one element selected from the copper family elements. For example under given conditions of pressure, temperature and reaction time, the former catalyst gives more yield of diamond crystals than the latter. If the latter catalyst is used with a poor quality carbonaceous material as containing a great deal of calcium oxide and silicon oxide the yield of diamond crystals decreases conspicuously when compared with those obtainable with high quality carbonaceous material such as graphite which is usable as an electrode for spectroanalysis. Whereas the former catalyst does not bring such conspicuous decrease in yield in relation to the quality of the carbonaceous materials to be employed in the synthesis of diamond crystals.

In summary, an advantage of the present invention over said copending application is that diamond synthesis can be carried out under less severe conditions in respect to pressure, temperature, reaction time and carbonaceous material to be employed. Another advantage of the present invention over said copending application is that fairly good yield of diamond will be obtained even with the carbonaceous materials of poor qualities under relatively low pressures and at relatively low temperatures.

Although exact reason for the occurrence of these advantages by this invention is not yet made clear owing to the fact that physical and chemical properties of niobium-copper family elements alloy system is not fully explained, this is believed to be due to increased affinity for carbonaceous material of niobium in the molten state by being in the state of carbide. Because, like well known catalyst system, molten niobium carbide-copper family elements catalyst first dissolves carbon and then takes it in until the catalyst becomes supersaturated with it, and finally precipitates the carbon in the form of diamond crystals out of the supersaturated state.

The diamond crystals obtained by the method of this invention have a very good appearance and properties. For example, highly transparent and colorless crystals can be easily obtained independently of the strict reaction conditions. As to their grain size, it is possible to secure generally uniform crystals of a grain size of tens of microns when graphite in fine powder form is used as a carbonaceous material, and of a grain size ranging from 0.2 to 0.5 mm. when massive graphite is used. With reference to the structure of the crystals formed a photograph of X-ray diffraction taken of diamonds synthesized by using a nickel catalyst reveals diffraction patterns of so-called satellites which can not be observed in perfect diamond crystals, while no patterns of satellites are observed in the diamond crystals obtained by the method of the present invention.

Although it is not fully understood why diamond crystals of such high qualities can be produced by the method of this invention, it is believed that this is due to the fact that diamond crystals to be formed in the existence of the new catalyst of this invention are subject to relatively less chances of their originating in nucleation and to a slacker growth than that in the presence of conventional catalysts such as nickel, iron, cobalt and so on. Further, when nickel or other conventional catalysts are used the nucleation of diamond crystals and the rate of its growth can never be controlled even under a catalyst diluted with non-catalytic metals. For example, when nickel catalyst is used, the crystal growth is finished usually within one minute of the treatment, taking impurities within the crystal and forming undesirable diamond crystals such as dendritic crystals. On the contrary, the crystal growth in the process defined by this invention continues for 5 to 20 minutes of the treatment making it possible that high purity diamond crystals are formed without severe restrictions on temperature and pressure controls.

For the purpose of carrying out the method of this invention, apparatus of any kind may be employed provided that they are capable of providing enough pressure and temperature. In the examples which follow, an apparatus similar to the one disclosed by H. Tracy Hall, pages 125 to 131, The Review of Scientific Instruments, vol. 31, No. 2 (1960) was employed to expose reaction vessels as shown in FIGS. 2 and 3 to high pressures and high temperatures.

The following examples are given by way of illustration and are not intended for purposes of limitation.

The metals employed in these examples, such as niobium, niobium carbides, copper, silver and gold were of a high purity of more than 99.9%, and the raw carbon used in the examples, except otherwise indicated, was also of such a high purity as to be used for an electrode in the spectroscopic analysis. The pressure referred to in the examples was calibrated by taking advantages of the pressure-induced phase transition of bismuth (26,000 kg./cm.$^2$), thallium (38,000 kg./cm.$^2$) and barium (60,000 kg./cm.$^2$). In measuring the temperature in the examples, a thermocouple was first used and later the temperature was estimated from heating wattage. Maximum probable errors in the pressure and the temperature were considered to be ±5,000 atmospheres and ±100° C., respectively. All percentages and parts were by weight.

EXAMPLE 1

A mixture of 3 parts of niobium carbide powder, 3 parts of copper and 5 parts of graphite powder was charged into a reaction vessel 11 (FIG. 2) consisting of a cylindrical graphite tube 12 having an inside diameter of 2 mm., an outside diameter of 4 mm. and a height of 9.5 mm., and disc graphite lids 13 and 14 each having a diameter of 4 mm. and a thickness of one millimeter. The vessel was subjected to a pressure of 50,000 atmospheres at a temperature of 1260° C. for 20 minutes. The content was then discharged from the vessel and boiled and washed with concentrated sulphuric acid, nitric acid and hydrofluoric acid, with the result that the formation of minute diamond crystals was observed in the residue.

EXAMPLE 2

A reaction vessel as described in Example 1 was filled with a mixture of 2 parts of niobium carbide powder, 2 parts of copper powder, and one part of graphite powder and allowed to stand for 20 minutes under a pressure of 53,000 atmospheres at a temperature of 1200° C. After the acid treatments as in Example 1 a number of diamond crystals whose grain size ranged from several tens of microns to 0.2 mm. were formed.

EXAMPLE 3

A mixture of 2 parts of niobium carbide powder, one part of gold powder and 2 parts of copper powder was filled into a reaction vessel 21 (FIG. 3) consisting of a columnar graphite tube 22 having an outside diameter of 4 mm. and a height of 6 mm., which had a hollow 24 having a diameter of 2.5 mm. and a depth of 4 mm. and which was sealed at its bottom with a disc lid 23 having a thickness of 2 mm. and a diameter of 4 mm. The vessel was subjected to a pressure of 60,000 atmospheres at a temperature of 1650° C. for 5 minutes, and thereafter subjected to the acid treatments of Example 1 with the result that a number of colorless and transparent diamond crystals having well-developed (111) faces were obtained.

EXAMPLE 4

This example illustrates the use of various combination of niobium carbide-copper family elements as catalysts in comparison to those of niobium-copper family elements for the conversion of graphite to diamond. The reaction vessel and procedure employed were similar to those in Example 1.

| Combinations of catalyst (weight percent) | Pressure (atm.) | Temperature (° C.) | Time (minutes) | Results (obtained diamond) (mg.) |
|---|---|---|---|---|
| (1) 50% Nb, 50% Cu | 71,000 | 1,800 | 15 | 5.6 |
| (2) 25% Nb, 25% NbC, 50% Cu | 71,000 | 1,800 | 15 | 8.9 |
| (3) 50% NbC, 50% Cu | 71,000 | 1,800 | 15 | 11.4 |
| (4) 50% Nb, 50% Cu | 73,000 | 1,800 | 15 | 10.4 |
| (5) 50% Nb, 50% Ag | 71,000 | 1,800 | 15 | 1.2 |
| (6) 50% NbC, 50% Ag | 71,000 | 1,800 | 15 | 6.2 |
| (7) 50% Nb, 50% Au | 71,000 | 1,800 | 15 | 0.8 |
| (8) 50% NbC, 50% Au | 71,000 | 1,800 | 15 | 5.8 |
| (9) 50% NbC, 25% Ag, 25% Cu | 71,000 | 1,800 | 15 | 11.3 |
| (10) 40% NbC, 30% Cu, 30% Au | 71,000 | 1,800 | 15 | 10.6 |
| (11) 60% NbC, 20% Ag, 20% Au | 71,000 | 1,800 | 15 | 6.3 |

As can be clearly noted from this table, the presence of niobium carbide greatly contributes to improving the yield of diamond as compared with pure niobium metal. For example, Combination 1, which does not belong to the present invention, falls far behind those of present invention, such as Combination 3, in diamond yield under the same reaction conditions. To increase its yield to the same level as that of the present invention with the same catalyst an increase in the reaction pressure of about 2,000 atmospheres is required as shown in Combination 4. The same is true for niobium-silver catalyst and niobium-gold catalyst represented by Combinations 5 and 7 respectively, which is incomparable in the yield of diamond to niobium carbide-silver catalyst and niobium carbide-gold catalyst represented by Combinations 6 and 8, respectively.

EXAMPLE 5

Reaction vessel made of a poor quality carbon material similar in shape to that of Example 1 was filled with one part of niobiumm carbide and two parts of copper and was subjected to the synthetic reaction for 15 minutes under a pressure of 71,000 atmospheres and a temperature of 1800° C. This resulted in a yield of 7 mg. of diamond crystals. For the purpose of comparison, the above experimentation was repeated under the same conditions as above except that one part of niobium carbide was replaced this time with one part of pure niobium, this resulted in a yield of as little as one milligram of diamond crystals. When the reaction temperature was raised up to 2000° C. the yield of diamond increased to 4 mg.

For further comparison, reaction vessel made of high purity carbon usable as an electrode in spectroanalysis was filled with one part of niobium powder and two parts of copper powder and was subjected to the synthetic reaction under the same conditions as above, viz at a pressure of 71,000 atmospheres, a temperature of 1800° C. and for a period of 15 minutes. As a result, a yield of 5 mg. of diamond was obtained.

According to the qualitative analysis the poor quality carbon material employed in the above experimentations were found containing as major impurities boron, calcium, silicon, magnesium and aluminium (clay), and as minor impurities of nitrogen, strontium, sulphur, oxygen, chome, sodium, titanium, manganese, iron and so on. The poor reactivity of this poor quality carbon material is believed to be due partly to these impurities mentioned above, and partly to its low degree of graphitization.

X-ray diffraction patterns obtained by photographing the diamond crystals obtained according to the above examples with a two hours' exposure under the conditions of CuK$_\alpha$ radiation, 40 kv. and 20 ma. were those inherent in diamond crystals, and no sateliltes could be observed at all.

Further, the quantitative analysis of the impurities contained in the diamond crystals obtained according to the method of this invention revealed a content ratio of impurities of only 0.01 to 0.10%.

In comparison, a diffraction photograph, which was taken of diamond crystals obtained by using a nickel catalyst with a twenty minutes' exposure under the conditions of $CuK_\alpha$ radiation, 35 kv. and 20 ma., showed diffraction patterns of so-called satellites, viz (111), (200), (220) and (311) corresponding to the lattice constant of 3.54 angstroms in the case of nickel catalyst, and these satellitic patterns were proven to be co-axial with those of the diamond. Usually, 0.3 to 1.0% of a catalyst metal is contained as an impurity in the synthetic diamond crystals obtained by using a nickel or an iron catalyst.

What is claimed is:

1. In the process of synthetically making diamonds by subjecting a carbonaceous material to high pressures and high temperatures, the improvement which comprise converting the carbonaceous material to diamond crystals at a pressure of at least 50,000 atmospheres and a temperature of at least 1200° C. in the presence of a catalyst, said catalyst being niobium carbide combined with at least one metal selected from copper, silver and gold.

2. The process according to claim 1 wherein said catalyst is in the form of an alloy.

3. The process according to claim 1 wherein said catalyst is in the form of a mixture.

References Cited

UNITED STATES PATENTS

| | | | |
|---|---|---|---|
| 2,947,609 | 8/1960 | Strong | 23—209.1 |
| 2,992,900 | 7/1961 | Bovenkerk | 23—209.1 |
| 3,334,968 | 8/1967 | Ishizuka | 23—209.1 |
| 3,346,102 | 10/1967 | Strong | 23—209.1 |

OTHER REFERENCES

Kohn et al. "The American Mineralogist," vol. 47, November-December 1962, pp. 1422–1430.

EDWARD J. MEROS, Primary Examiner